(12) United States Patent
Hariharan et al.

(10) Patent No.: US 7,865,912 B2
(45) Date of Patent: *Jan. 4, 2011

(54) METHOD AND SYSTEM FOR MANAGING TABLES THAT ARE USED BY NETWORK PROCESSORS TO CONTROL TRAFFIC THROUGH A NETWORK

(75) Inventors: Seeta Hariharan, Raleigh, NC (US); Brooks Johnston, Cary, NC (US); Marc C. Lavergne, Wake Forest, NC (US); Sridhar Rao, Raleigh, NC (US); Bahram Sanaei, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 624 days.

This patent is subject to a terminal disclaimer.

(21) Appl. No.: 11/942,657

(22) Filed: Nov. 19, 2007

(65) Prior Publication Data

US 2008/0072242 A1    Mar. 20, 2008

Related U.S. Application Data

(63) Continuation of application No. 10/706,232, filed on Nov. 12, 2003, now Pat. No. 7,325,239.

(51) Int. Cl.
*G06F 17/24* (2006.01)
*G06F 9/44* (2006.01)

(52) U.S. Cl. .................................. 719/328; 709/232

(58) Field of Classification Search ........................ None
See application file for complete search history.

(56) References Cited

U.S. PATENT DOCUMENTS

| 5,097,533 | A | 3/1992 | Burger et al. |
|---|---|---|---|
| 5,339,421 | A | 8/1994 | Housel, III |
| 5,623,695 | A | 4/1997 | Lozinski et al. |
| 5,966,707 | A | 10/1999 | Van Huben et al. |
| 5,970,232 | A | 10/1999 | Passint et al. |
| 6,292,843 | B1 | 9/2001 | Romano |
| 6,370,585 | B1 | 4/2002 | Hagersten et al. |
| 7,003,527 | B1 | 2/2006 | Lavallee et al. |
| 7,051,101 | B1 | 5/2006 | Dubrovsky et al. |
| 2002/0091856 | A1 | 7/2002 | Brown |
| 2002/0171546 | A1 | 11/2002 | Evans et al. |

*Primary Examiner*—Hyung S Sough
*Assistant Examiner*—Abdou K Seye
(74) *Attorney, Agent, or Firm*—Yee & Associates, P.C.; Mark E. McBurney (57) ABSTRACT

A method for managing tables that are used by network processors to control network traffic through a network. The method comprises including a first table management software application in a first network processor, in which the first table management software is dedicated to managing only tables associated with the first network processor; including a second table management software application in a second network processor, in which the second table management software application is dedicated to managing only tables associated with the second network processor; and including a table management control application in a host processor, in which the table management control application is configured to respectively manage the tables associated with the first network processor and the tables associated with the second network processor through the first table management software application and the second table management software application through a plurality of generic application programming interfaces (APIs).

3 Claims, 6 Drawing Sheets

METHOD AND SYSTEM FOR MANAGING TABLES THAT ARE USED BY NETWORK PROCESSORS TO CONTROL TRAFFIC THROUGH A NETWORK

CROSS REFERENCE TO RELATED APPLICATIONS

This application is a continuation of application Ser. No. 10/706,232, filed Nov. 12, 2003, now U.S. Pat. No. 7,325,239, the entire contents of which are incorporated by reference herein.

FIELD OF THE INVENTION

The present invention relates to computer systems, and more particularly to a method and system for providing a mechanism for allowing a host to manage tables, such as lookup tables, in a scalable, flexible manner.

BACKGROUND OF THE INVENTION

Driven by increasing usage of a variety of network applications, such as those involving the Internet, computer networks are of increasing interest. In order to couple portions of a network together or to couple networks together, network processors residing in switches, routers, and/or other components are typically used. In order to adequately control the traffic through the network, the network processor must classify packets and perform other functions that use tables, such as lookup tables. In order to use these tables, the properties of the tables are managed. For example, size, the data structure and corresponding speed, the location (memory selected), the insertion of entries in the tables, and certain relationships between tables are controlled. Thus, a network administrator typically desires to manage the properties of the tables being used by the network processors.

Figure 1:
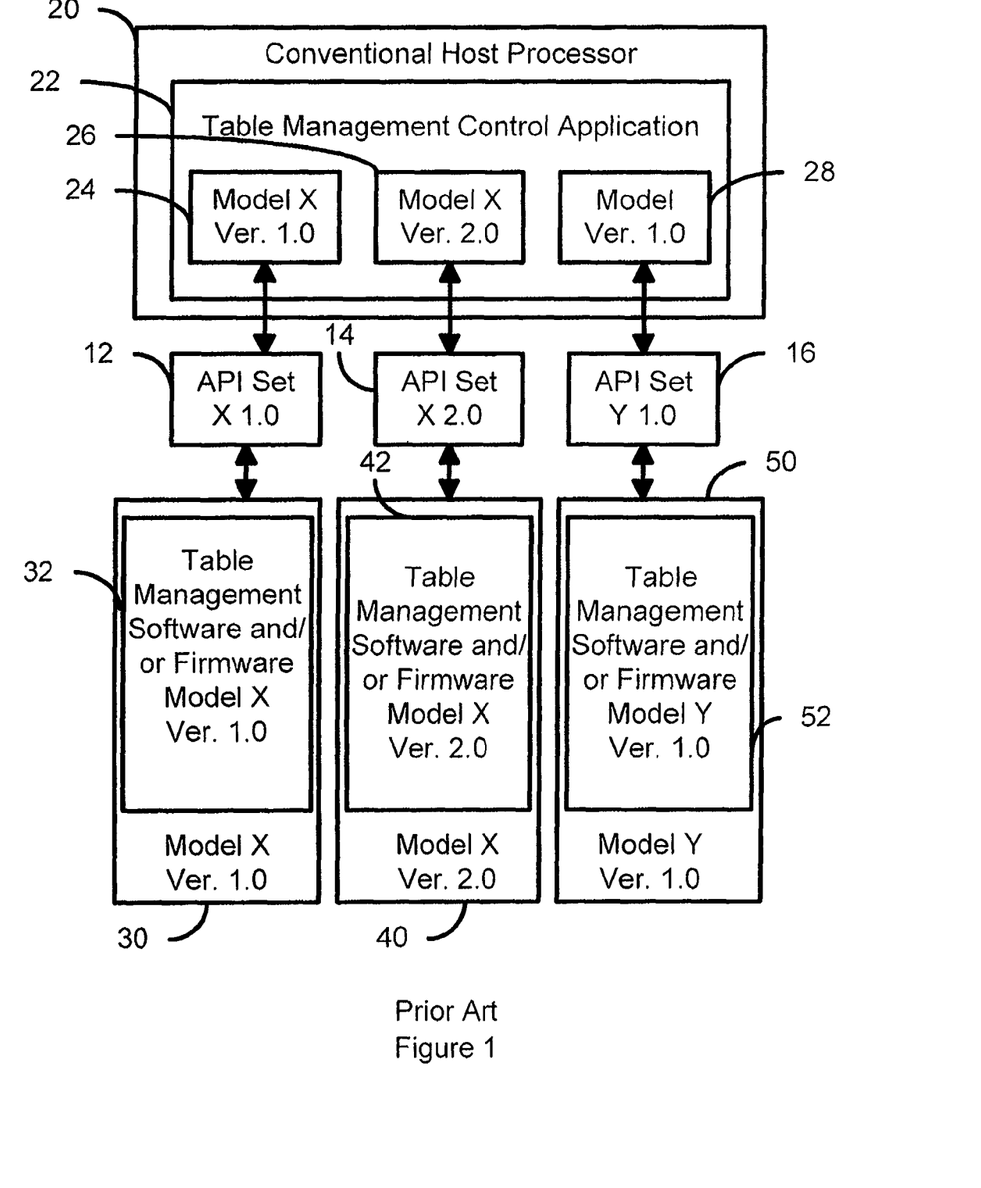
FIG. 1 is a diagram of a conventional system for managing tables for conventional network processors.

FIG. 1 depicts a block diagram of a conventional system 10 for managing tables of network processors. The system 10 includes a conventional host processor 12 used by a network administrator and conventional network processors 30, 40, and 50. The conventional host processor 10 typically includes a table management application 22 that is developed at least in part by the owner of the conventional system 10. The network administrator uses the conventional table management application 22 to configure, update, and otherwise manage the tables, such as lookup tables, of the conventional network processors 30, 40, and 50 in the conventional system 10.

The conventional network processors 30, 40, and 50 are typically purchased by the owner of the conventional system 10. The conventional network processors 30, 40, and 50 each includes conventional software and/or firmware 32, 42, and 52, respectively, that are used in managing the tables (not explicitly shown). In addition, the conventional software and/or firmware 32, 42, and 52 may be different. For example, the conventional network processors 30, 40, and 50 may include different versions of a particular model of network processor from a particular vendor and/or other model(s) of network processor that may be from other vendors. Thus, the conventional network processors 30 and 40 are depicted as having software and/or firmware 32 and 42 that are different versions of a Model X network processor, while the software and/or firmware 52 of the conventional network processor 50 is a Model Y network processor. Because the conventional network processors 30, 40, and 50 are designed to communicate with different control applications, each conventional network processor 30, 40, and 50 utilizes conventional application program interfaces (APIs) 12, 14, and 16, respectively, that are specific to the particular software and/or firmware 32, 42, and 52, respectively.

The conventional table management application 22 is used to manage the tables used by the conventional network processors 30, 40, and 50, respectively. The conventional table management application 22 thus includes a corresponding set of conventional behaviors 24, 26, and 28 for each set of the conventional APIs 12, 14, and 16, respectively. The conventional APIs 12, 14, and 16 are designed to communicate with the conventional behaviors 32, 42, and 52, respectively. The conventional APIs 12, 14, and 16 are also used to control the corresponding software and/or firmware 32, 42, and 52, respectively. Thus, using the conventional behaviors 24, 26, and 28 corresponding to the conventional APIs 12, 14, and 16, respectively, the conventional table management application 22 can control the tables for the conventional network processors 30, 40, and 50, respectively.

Although the conventional system 10 functions, one of ordinary skill in the art will readily recognize that the conventional system is difficult to scale and may have high maintenance costs. The conventional network processors 30, 40, and 50 are typically heterogeneous in nature. Because the conventional network processors 30, 40, and 50 are heterogeneous, the conventional network processors may include different versions of a particular model of network processor and/or different models of network processor. In addition, the way in which particular tables are used in each conventional network processor 30, 40, and 50 may differ widely. Thus, the software and/or firmware 32, 42, and 52 of different network processors typically differ. The APIs 12, 14, and 16 thus also differ. Consequently, the corresponding behaviors 24, 26, and 28 of the conventional table management application 22 are distinct. One of ordinary skill in the art will also readily recognize that the conventional system 10 may actually include a large number of network processors. Consequently, the number of conventional APIs 12, 14, and 16 with which the conventional table management application 22 must be compatible may be large. As a result, the number of distinct conventional behaviors used by the conventional host processor 20 and developed by the owner of the conventional system 10, such as the conventional behaviors 24, 26, and 28, may be large. As a result, the conventional table management application 22 may be complex and include an amalgamation of a variety of behaviors, one for each model and/or version of conventional network processor. It may thus be difficult to incorporate new network processors, which may have software and/or firmware and thus APIs not previously supported. The conventional system 10 is, therefore, difficult to scale. Because of difficulties in incorporating new software and/or firmware and their corresponding APIs, evolving the conventional table management application 22 and, therefore, the conventional system 10 to utilize improved network processors may be problematic. Furthermore, because supporting a variety of conventional behaviors 24, 26, and 28 makes the conventional table management application 22 more complex, the conventional system 10 may be subject to higher maintenance costs.

Accordingly, what is needed is a system and method for allowing a host to manage tables used by a network processor in a scalable, flexible manner. The present invention addresses such a need.

BRIEF SUMMARY OF THE INVENTION

The present invention provides a method and system for managing a plurality of tables for a plurality of heterogeneous network processors in a network. The network also includes at least one host processor that utilizes at least one table management application. The method and system comprise providing a plurality of generic application program interfaces (APIs). The generic APIs communicate with the control application(s) and the heterogeneous network processors.

The generic APIs communicate with the table management application(s) in a network processor independent manner, but manage the tables for the heterogeneous network processors in a network processor specific manner. Thus, the generic APIs allow the control application(s) to be network processor independent and to manage the tables for the heterogeneous network processors in the network processor specific manner.

According to the system and method disclosed herein, the present invention provides a generic mechanism for managing the tables for network processors. As a result, a customer need not maintain a table management application having different sets of API for different types (e.g. models and/or versions) of network processors.

The details of one or more implementations are set forth in the accompanying drawings and the description below. Features and advantages will be apparent from the description and drawings, and from the claims.

BRIEF DESCRIPTION OF SEVERAL VIEWS OF THE DRAWINGS

Like reference symbols in the various drawings indicate like elements.

DETAILED DESCRIPTION OF THE INVENTION

The present invention relates to an improvement in computer system. The following description is presented to enable one of ordinary skill in the art to make and use the invention and is provided in the context of a patent application and its requirements. The present invention is not intended to be limited to the embodiments shown, but is to be accorded the widest scope consistent with the principles and features described herein.

The present invention provides a method and system for managing a plurality of tables for a plurality of heterogeneous network processors in a network. The network also includes at least one host processor that utilizes at least one table management application. The method and system comprise providing a plurality of generic application program interfaces (APIs). The generic APIs communicate with the control application(s) and the heterogeneous network processors. The generic APIs communicate with the table management application(s) in a network processor independent manner, but manage the tables for the heterogeneous network processors in a network processor specific manner. Thus, the generic APIs allow the control application(s) to be network processor independent and to manage the tables for the heterogeneous network processors in the network processor specific manner.

The present invention will be described in terms of a particular computer system, a particular network processor, and certain APIs. However, one of ordinary skill in the art will readily recognize that this method and system will operate effectively for other computer system and network processors, as well as additional and/or other APIs. The present invention is also described in the context of a network including specific components and a particular number of components. However, one of ordinary skill in the art will readily recognize that the present invention is consistent with other networks containing other and/or additional components as well as another number of components. The present invention is also described in the context of particular types of tables. One of ordinary skill in the art will readily recognize that the method and system are consistent with other types of tables.

Figure 2:
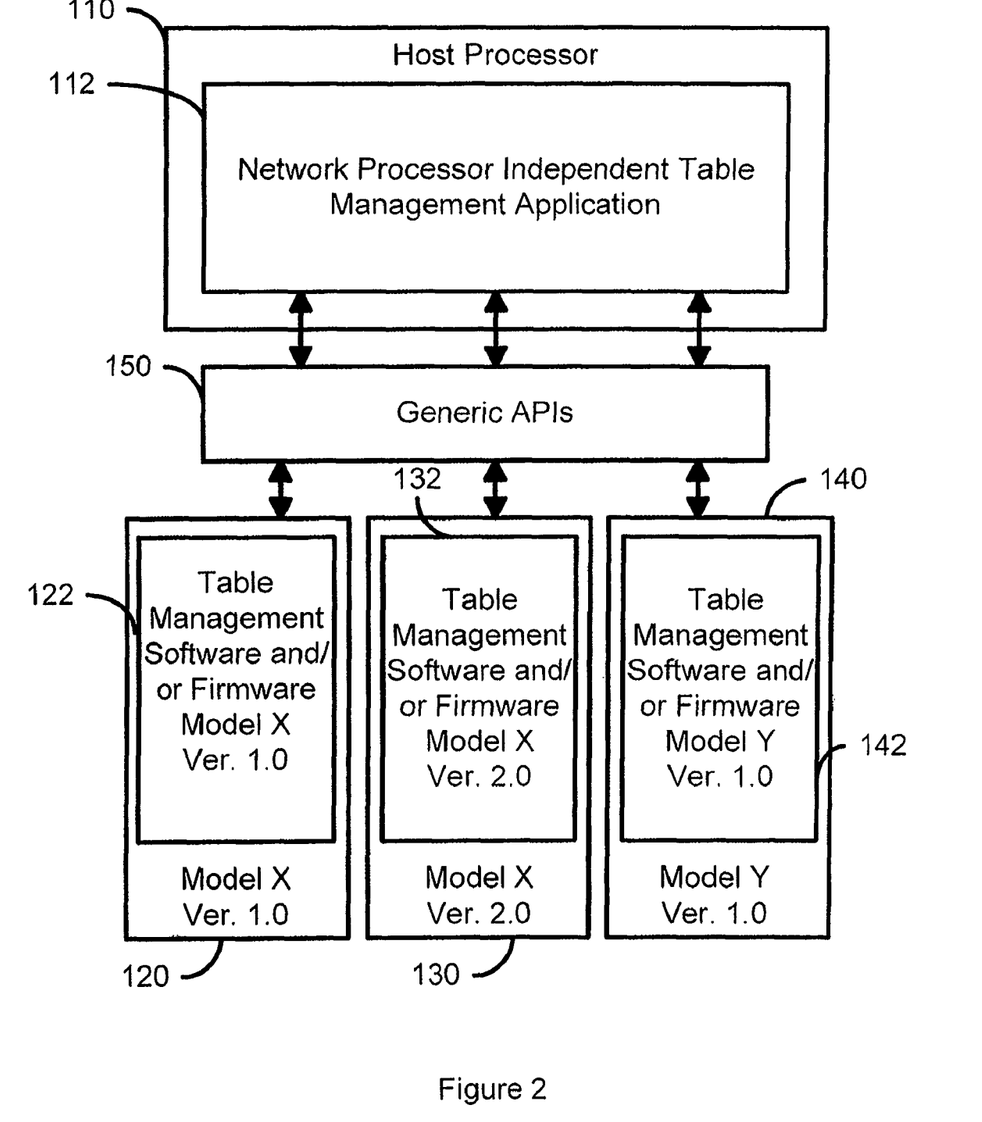
FIG. 2 is a high-level diagram of one embodiment of a system in accordance with the present invention for managing tables for network processors.

To more particularly illustrate the method and system in accordance with the present invention, refer now to FIG. 2, depicting one embodiment of a system 100 in accordance with the present invention for managing tables (not shown) for network processors. The system 100 is depicted as including a host processor 110 and network processors 120, 130, and 140. The host processor 110 includes a table management application 112. The network processors 120, 130, and 140 include table management software and/or firmware 122, 132, and 142, respectively. However, one of ordinary skill in the art will readily recognize that the generic APIs 150 are of particular utility. In addition, the generic APIs 150 are depicted as a separate entity. However, one of ordinary skill in the art will readily recognize that the host processor 110 and network processors 120, 130, and 140 utilize the generic APIs 150 for communication and control.

The network processors 120, 130, and 140 are capable of being heterogeneous. Thus, the network processors 120, 130, and 140 may have hardware, software, and/or firmware for managing tables that differ significantly. For example, as depicted in FIG. 2, the software and/or firmware 122 for the network processor 120 is Model X, Version 1.0. In contrast, the network processor 130 includes software and/or firmware 132 that is Model X, Version 2.0. The network processor 140 is a completely different model, having software and/or firmware 142 that is Model Y, Version 1.0. Other network processors (not shown) having different models and/or versions may also be included. Because they are heterogeneous, in the absence of the present invention, the network processors 120, 130, and 140 would each require a separate network processor specific set of APIs in order to be controlled by a conventional table management application, such as the conventional table management application 12 depicted in FIG. 1.

Referring back to FIG. 2, the generic APIs 150 include APIs are used by the table management application 112 and the network processors 120, 130, and 140. In particular, the generic APIs communicate with and are used by the table management application 112 in a network processor independent manner. In other words, the table management application 112 is network processor independent. In the context of the present application, a network processor independent manner means that the table management application 112 need not contain knowledge of the specific hardware, software, and/or firmware 122, 132, and 142 of any of the network processors 120, 130, and 140, respectively, for which tables are being managed. At the same time, the table management application 112 can control the tables for the network processors 120, 130, and 140 by managing the software and/or firmware 122, 132, and 142, respectively. Because the table management application 112 is network processor independent, the table management application 112 can control, such as configuring and updating, the tables for the network processors 120, 130, and 140 without requiring specific knowledge of the hardware or software and/or firmware 122, 132, and 142, respectively of the individual network processors 120, 130, and 140, respectively.

The generic APIs 150 also communicate with and control the network processors 120, 130, and 140 in a network processor specific manner. In the context of the present application, network processor specific includes a knowledge of the specifics of a particular network processor, such as the hardware, software and/or firmware 122, 132, and 142, and possibly other components used by the particular network processor 120, 130, and 140, respectively. Thus, the APIs 150 allow the table management application 112 to be network processor independent while allowing each of the network processors 120, 130, and 140 to be control in a network processor specific manner.

Using the system 100, and more particularly the generic APIs 150, the table management application 112 can be network processor independent. Because of the use of the generic APIs, the table management application 112 can still control the tables for the potentially heterogeneous network processors 120, 130, and 140 in a network processor specific manner. As a result, the table management application 112 need not include a separate set of APIs for each type of network processor 120, 130, and 140 used. The table management application 112 is, therefore, simpler. As a result, it is significantly simpler to scale the system 100, including adding new types of network processors. It is thus also easier to improve the performance of the system 100 by adding improved network processors. In addition, the maintenance costs of the system 100 may be reduced due to the use of a simpler table management application 112.

Figure 3:
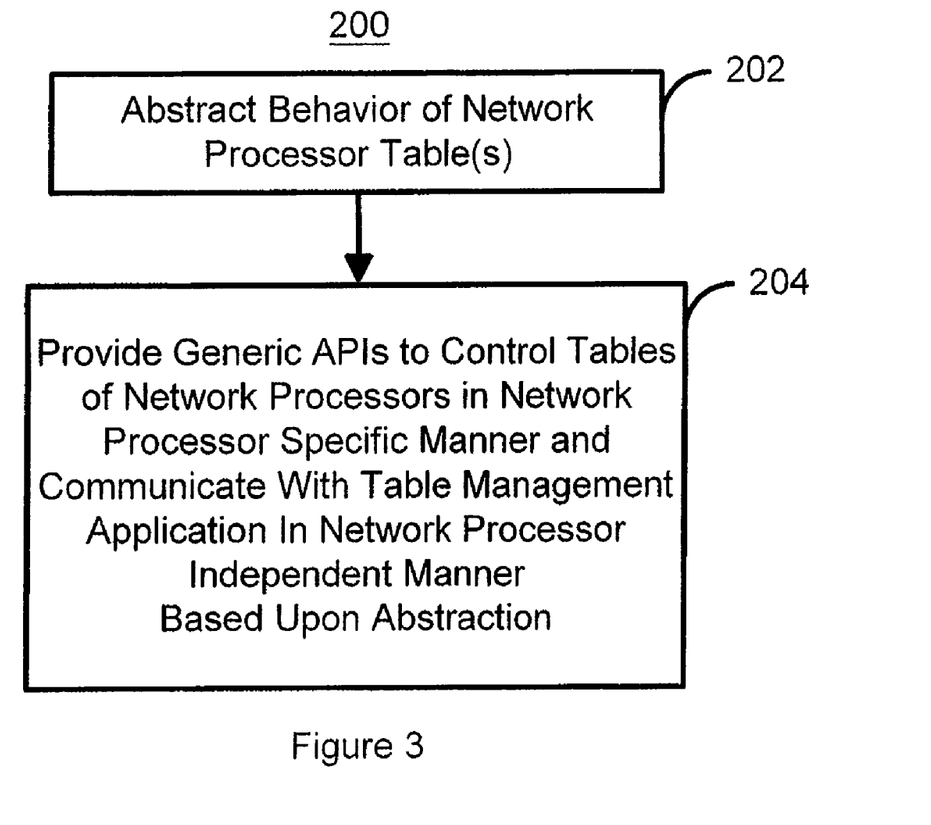
FIG. 3 is a high-level flow chart depicting one embodiment of a method in accordance with the present invention for providing a mechanism in accordance with the present invention for managing tables for network processors.

FIG. 3 is a high-level flow chart depicting one embodiment of a method 200 in accordance with the present invention for providing a mechanism in accordance with the present invention for managing tables for network processors. The method 200 is described in the context of the system 100 depicted in FIG. 2. In particular, the method 200 may be used to determine the generic APIs 150. Referring to FIGS. 2 and 3, the table management application 112 can then be developed in a network processor independent manner using the generic APIs 150. Similarly, the network processors 120, 130, and 140, which may be heterogeneous, have components such as software and/or firmware 122, 132, and 142, respectively, that can be managed by the generic APIs 150 in a network specific manner. The network processors 120, 130, and 140 may thus be controlled in a network processor specific manner using the generic APIs 150.

The properties of the tables (not shown in FIG. 2.) used by the network processors, such as the network processors 120, 130, and 140, are abstracted, via step 202. Each network processor 120, 130, and 140 has specific tables used in a certain manner. Step 202 abstracts the tables to a more general level.

For example, the tables used by network processors, such as the network processors 120, 130, and 140, are complex data structure that exhibits certain properties. Each table acts as a container for one or more user data records and maintains various states. Each table also typically has a maximum size, or number of records of fixed size that can be stored.

In a preferred embodiment, step 202 abstracts the tables as either fast or standard tables. The tables are placed in various memories either internal or external to the corresponding network processor 120, 130, and/or 140. Tables may, for example, be placed in Dynamic Random Access Memories (DRAMs) and Static Random Access Memories (SRAMs). The speed with which data can be accessed from a table depends upon factors, such as the size, the placement in memory and the type of search algorithm used by the table. In step 202, the table size and the memory in which the records are placed (i.e. the memory in which the tables are placed), are abstracted to fast tables and standard tables. Fast tables are small in size in comparison to standard tables and are placed in memories internal to the corresponding network processor 120, 130, or 140 or in SRAMs. Standard tables may be very large in size and are placed in slower memories such as DRAMs. Thus, step 202 abstracts the type of table to fast or standard. However, the exact interpretation of this abstract concept can depend on the software and/or firmware 122, 132, and 142 implemented by a specific network processor.

Figure 4A:
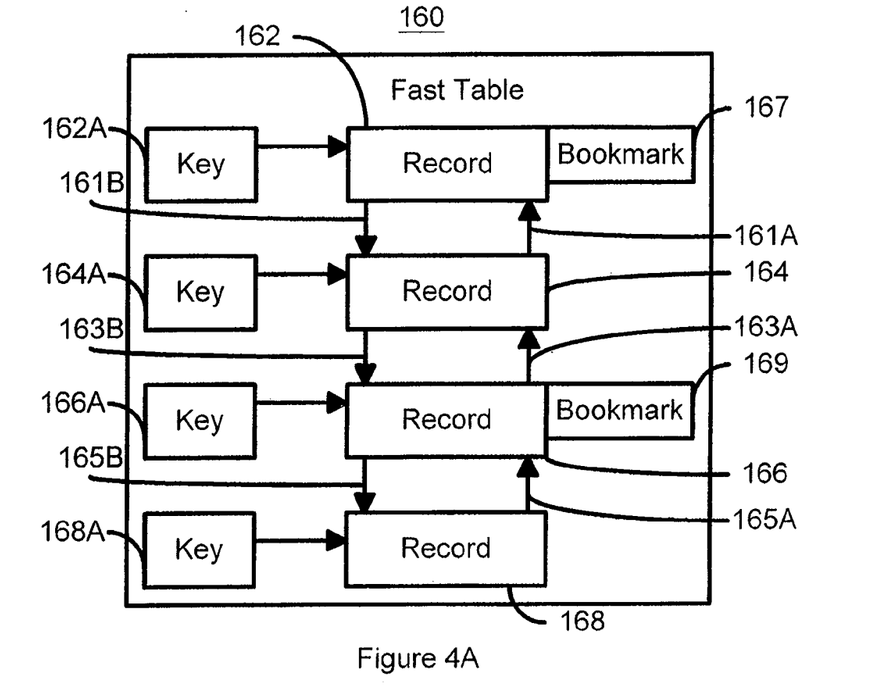
FIGS. 4A-4D depict embodiments of generalized tables for network processors abstracted in accordance with the present invention.
Figure 4B:
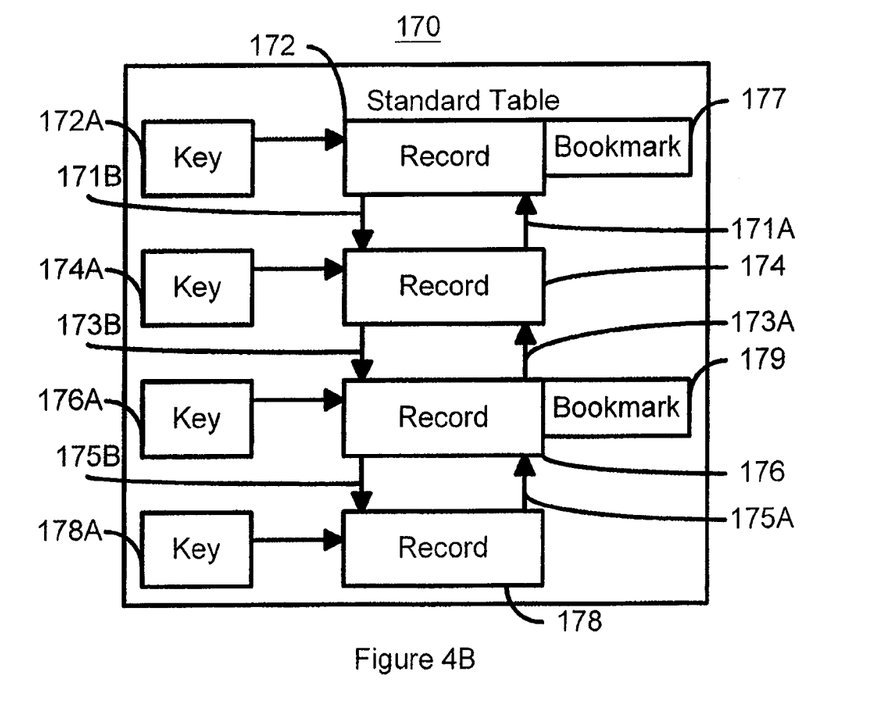

For example, FIGS. 4A and 4B depict abstractions of a fast table 160 and a standard table 170, respectively. The tables 160 and 170 also represent abstractions of other features of tables. The fast table 160 is depicted as including records 162, 164, 166, and 168, as well as bookmarks 167 and 169. The records 162, 164, 166, and 168 have corresponding keys 162A through 168A. Also shown are pointers 161A, 161B, 163A, 163B, 165A, and 165B. As discussed below, the keys 162A through 168A are generally used for exact matches. In other words, an exact match for one of the keys 162A through 168A is typically searched for in the fast table 160. The standard table 170 also include records 172, 174, 176, and 178, corresponding keys 172A through 178A, and pointers 171A, 171B, 173A, 173B, 175A, and 175B. However, the algorithm typically used for a standard table, as discussed below, is generally a longest prefix match.

In addition to abstracting the table type, the step 202 preferably abstracts the search algorithm used by the tables. For example, tables may generally be accessed in a random manner or in a sequential manner. When accessed in a random manner, a search key is provided. The type of search key that is provided depends on the search algorithm that the table uses to access a particular record. A table generally incorporates one algorithm for accessing records randomly. In one embodiment, the abstracting step 202 defines two types of search keys corresponding to two types of search algorithms. The keys are exact match keys, such as the keys $162a$ through $168Aa$ and longest prefix match keys, such as the keys $172a$ through 178A, as depicted in FIG. 4B. The maximum length of these keys need not be specified but is preferably large enough to support the largest key that could be specified in a heterogeneous system of network processors.

If sequential access is supported by a table, then records in a table may also be accessed sequentially from the beginning of the table or from some marked location within the table. Thus, the tables 160 and 170 are depicted as including pointers 161A, 161B, 163A, 163B, 165A, and 165B and 171A, 171B, 173A, 173B, 175A, and 175B. The sequential access to records may occur in a forward direction (where the term forward indicates access to the $n+1^{th}$ record following the $n^{th}$ record) or in a backward direction (where the term backward indicates access to the $n-1^{th}$ record following the $n^{th}$ record) or both. If sequential access is supported, then all of the records in the table are circularly linked. Therefore, there is no concept of the beginning (or end) of a table since there is no reference point to support this concept. However, tables may support bookmarks, such as the bookmarks 167, 169, 177, and 179, that may temporarily indicate a reference point for sequential access of records. A bookmark, such as the bookmarks 167, 169, 177, and 179, indicates the starting point of a sequential access. The complete table is said to have been sequentially traversed if the $N+1^{th}$ (or $N-1^{th}$ for a backward access) sequential access returns a bookmarked record.

A table, such as the table 160 or 170, is multi-user in nature, which enables multiple entities to access the table 160 or 170, respectively. The table management application 112 entity on the host processor 110, (and its proxy on each network processor 120, 130, or 140 if so implemented) is also considered to be an Administrative entity. All entities may access the table simultaneously to either perform random/sequential searches or to insert/delete/update a Record in the Lookup Table. Each entity that wishes to perform a sequential search on the table registers with the table and obtains a sequential access user identifier. This identifier enables a table 160 or 170 to manage the bookmarks 167 and 169 or 177 and 179, respectively, associated with each registered entity independently. Thus, all registered entities are able to sequentially access the entries 162, 164, 166, and 168 and 172, 174, 176, and 178 in the table 160 and 170, respectively, simultaneously without adversely affecting one another.

Figure 4C:
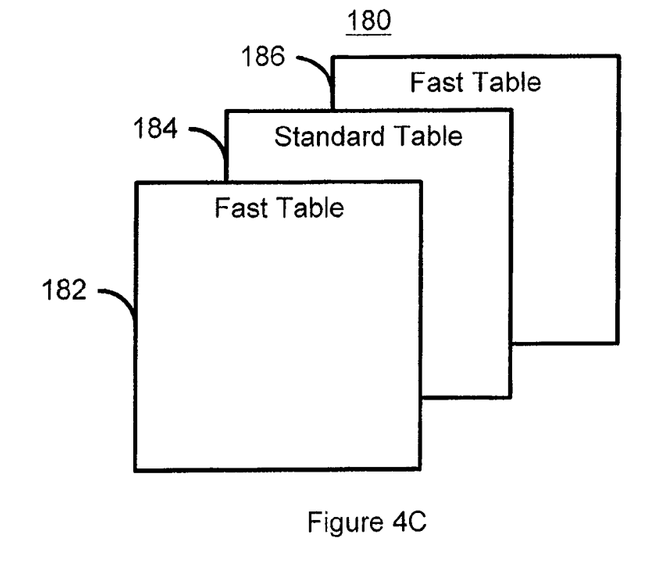

FIG. 4C depicts an abstraction of a cascade of tables 182, 184, 186, and 188. A table may be cascaded with other tables if the tables support the same type of search key/algorithms. When tables are cascaded, the random search for a particular record extends into the other tables in the cascade until a 'hit' is detected. A search failure is reported only when the search for the requested record fails through all tables in the cascade. Thus, in the cascade 180 a search of the table 182 would extend into tables 184 and 186. Further, note that the cascade 180 can include both fast tables 182 and 186 as well as a standard table 184. Thus, tables 182, 184, and 186 of different types can be placed in the cascade 180.

The records are an integral part of the table. Thus, the abstraction step 202 also abstracts the operations relating to records. The records of a table are of a fixed length. The length is specified as part of the table definition process. The record contains the user specific data and may contain other implementation-specific control information required to implement certain behaviors, such as sequential access. In addition, any record in a lookup table can be added to, modified or deleted by the table (if the record not being accessed at that time by another entity). The table incorporates behavior to ensure that sharing violations are avoided.

Figure 4D:
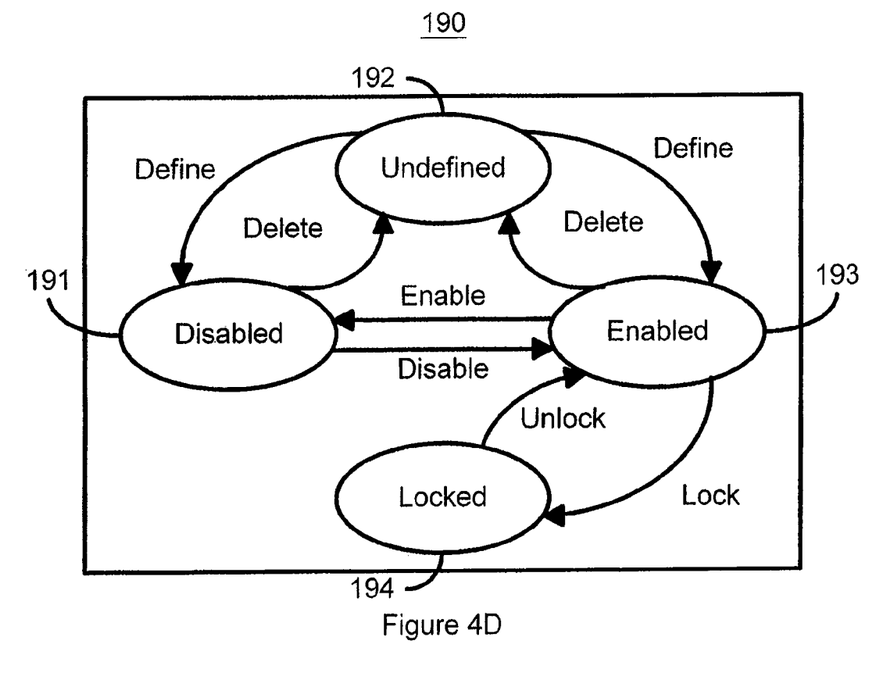

FIG. 4D depicts the states 190 of a table. The possible states of the table include disabled 191, undefined 192, enabled 193 and locked 194, which interrelate in the manner depicted in FIG. 4D. The access to a table is preferably limited to one administrative entity. This limitation allows operations such as taking a table out of service for maintenance or debug reasons. In order to provide this facility, every table maintains states 190. When in the disabled state 191, the table is out of service. The table cannot be accessed except by the administrative entity or its proxy on the network processor. In this state, the administrative entity may only delete the table, purge the entries in the table or enable the table. When in the undefined state 192, the identifier for the table has not been bound to a set of table characteristics. When in the enabled state 193, the table is in service and is generally accessible to all entities. All access operations are preferably available except the ability to define the table or delete the table. When the table is in the locked state 194, the table is in service, but is temporarily unavailable for access except by the administrative entity. All table operations are available for the Administrative Entity except the ability to define the table, delete the table, enable the table and disable the table.

In the network processors 120, 130, and 140, the information in the records of a table have a finite time period during which it is valid. On the expiration of this time period, the entries are automatically deleted from the table. The process of deleting a record after a finite time period is referred to as aging. Thus, step 202 preferably also abstracts the aging process for tables. The abstraction of tables performed in step 202 supports the aging function. In a preferred embodiment, the abstraction will require users to specify if aging is required to be supported on the table and if so, the identifier of an aging procedure that needs to be invoked, the elapsed time interval between aging cycles, the number of records that must be visited in a single cycle, and/or any other information used in aging. Other aspects of the tables are preferably also abstracted in step 202.

The generic APIs 150 are defined using the abstraction provided, via step 204. Thus, step 204 provides the generic APIs 150 that can preferably manage tables, such as the tables 160 and 170, for the network processors 120, 130, and 140. Furthermore, where a particular operation is not supported by tables for a particular network processor 120, 130, and 140, the generic APIs 150 account for this by providing a null behavior to the table management application 112.

Step 204 also provides the generic APIs 150 such that the APIs can be used with a network processor independent table management application 112. Thus, using the method 200, the generic APIs 150 can be provided. The network processor independent table management application 112, as well as the network processors 120, 130, and 140 can be developed to utilize the generic APIs 150.

In a preferred embodiment, the generic APIs 150 include at least APIs for configuring and updating the tables for each of the network processors 110, 120, and 130 in a network processor specific manner. The generic APIs thus include APIs that govern the tables in general as well as the entries (or records). The generic APIs 150 preferably include APIs for setting the type of the table and setting the states of the table: defining, enabling, disabling, and locking tables. The generic APIs also include APIs for linking (cascading), tables, updating entries, adding entries, deleting entries, purging entries, and aging entries. In addition to controlling the tables for the network processors 110, 120, and 130 in a network processor specific manner, the APIs 150 preferably also return a null behavior for a particular function that is not implemented by a particular network processor.

In a preferred embodiment, the generic APIs 150 include twenty-five APIs. The APIs preferably include: Table Define, Table Delete, Table Add Entry, Table Update Entry, Table Read Entry, Table Delete Entry, Table Purge, Table Set Link, Table Switch Version, Table Enable, Table Disable, Table Lock, Table Unlock, Table View Config, Table List, Table Register SA, Table Deregister SA, Table Get Current Entry, Table Get Next Entry, Table Get Previous Entry, Table Process Entry, Table Set Bookmark, Table Go to Bookmark, Table Start Aging, and Table Stop Aging. In a preferred implementation of the generic APIs, including the configure, update, enable, disable, and list APIs, parameters and fields are specified. Table 1 describes a preferred embodiment of the fields used.

TABLE 1

| Field Name | Field Description |
| --- | --- |
| Aging Entries | Number of entries to scan per aging cycle. |
| Aging Function | Selection of aging algorithms. A value of zero indicates No Aging. |
| Aging Interval | Number of seconds in aging cycle. |
| AutoEnabled | Enable table immediately upon creation. |
| Bookmark ID | The User's Bookmark ID to use. |
| Cache Enabled | Enable cache |
| Data | Entry data |
| Data Offset | Number of bytes in the entry to skip before writing the Data field. |
| Data size | the size in bytes of the data that will be added |
| Direction | Direction of travel in the Sequential Access table |
| Entry Data Size | Size of entry in bytes |

TABLE 1-continued

| Field Name | Field Description |
|---|---|
| EntryProcedure ID | Identifier of the procedure to call for processing an entry |
| Entry size | Fixed entry size in bytes or, if entry type is variable this is the maximum size. |
| Error Area Size | Size of error message in Words starting from Word 2 |
| Error Code | Component specific error code |
| Hash Algorithm | Hash algorithm selection. A value of zero indicates that no hashing is performed on the key. |
| Invoke ID | A field used by the Service Requestor to correlate invocations with responses. |
| Key | Key bits |
| Key length | Length of LPM key (in bits) to use for this operation. This field is ignored on tables that have been defined as exact-match. |
| Key length fields | These 8 bit fields define the lengths of each key part. The number of these fields is indicated in Number Key Fields above. For West multi-field keys are not implemented so only Key Field 0 is used. |
| Mask Size | Indicates the size of the Mask for Invert mode only. |
| Max Key size | Maximum number of bits in a key for this table. |
| Max Table size | Maximum number of entries |
| New Version | New Table ID |
| NextTable ID | Identifies the next table that will be referenced in the case of an unsuccessful search. A value of 255 indicates that no other tables will be searched. This feature should not be used if Cache Enabled is selected. |
| Number key fields | Number of key fields to use during searches of this table. The lengths of these fields are defined in the variable sized key_length_fields. For West, this number is 1. |
| Operation Class | Indicates the conditions under which a response is to be sent to the Service Requestor. |
| Operation Code | Indicates the operation whose invocation is being requested. |
| Operation Version | Indicates the version level of the operation. |
| Output Mode | Select amount of information in response. If this feature is active, configuration data for each table is returned. If this feature is off, only the Table IDs are returned. |
| Parameter Area Size | Indicates the size (in words) of the parameter area associated with this operation. |
| Placement Data | These fields are defined at design time to contain any hardware dependent table resource information. Note: For West, there are no Placement Data for this field. |
| Placement Data Length | The number of words in the variable length Placement Data field. Not use in West implementation. |
| Resource Allocation | Table Resources can be allocated manually or automatically. |
| Method | Manual allocation requires resource data to be supplied in the Placement Data field and the corresponding size in Placement Data Length. |
| Result Area Size | Size of result message in Words starting from Word 2 |
| SA_User ID | The SA_User ID that should be freed. |
| Search type | Type of search supported under the table. Can be Exact Match, Longest-Prefix Match or Range Match. |
| Sequential access | Type of sequential access allowed under this table. Entries can be scanned forward, forward/backward or none. |
| Service Element Type | Indicates the nature of service. The possible values are: API-INVOKE, API-RESULT or API-ERROR. |
| Table ID | Table Identifier |
| Table speed | For automatic table resource allocation, select one of two types of tables: normal and expedited. If the Resource Allocation method is selected as manual, this field is not used. |
| Threshold | Send notification if number of entries exceeds this threshold. Do not send notification if this value is zero. |
| Update mode | Select mode of update: Standard, Select, Invert. Select and Invert modes require the Mask field to indicate bit positions to be modified. |

Some portion of the above fields are preferably used by the generic APIs 150 for performing different operations, such as configuring and invoking different types of congestion control at various points in the network processor. Note, however, that an alternate embodiment might use additional and/or other fields having other uses.

Preferred embodiments of the Table Define API, Table Delete API, Table Add Entry API, Table Update Entry API, Table Read Entry API, Table Delete Entry API, Table Purge API, Table Set Link API, Table Switch Version API, Table Enable API, Table Disable API, Table Lock API, Table Unlock API, Table View Config API, Table List API, Table Register SA API, Table Deregister SA API, Table Get Current Entry API, Table Get Next Entry API, Table Get Previous Entry API, Table Process Entry API, Table Set Bookmark API, Table Go to Bookmark API, Table Start Aging API, and Table Stop Aging API are described below. However, nothing prevents the use of additional and/or different APIs.

The table define API allows the table management application 112 to define the characteristics of a table. A TableID is supplied by the user to identify the table to the system and is bound to those defined characteristics. Once a TableID is defined, it uniquely identifies the table until the table is deleted. The parameters associated with this API are as shown in Table 2. If the operation is successful and sequential access is specified, a Sequential Access ID is returned.

TABLE 2

| Parameter Name | Value | Remarks |
|---|---|---|
| Table ID | 0 ... 255 | Defines one of 256 tables in a NP. |
| Search Key Length | 0 ... 255 | Length is defined in bits. |
| Search Type | Exact Match Longest Prefix Match | |
| Sequential Access Method | No Sequential Access Forward Only Forward and Backward | |
| AutoEnable | True False | True means the Table is automatically transitioned to Enabled State (else it is left in the Disabled State). |
| Table Speed | Normal Expedited | These correspond to Standard and Fast Tables mentioned in the abstract model. |
| Record Size | 1 ... 1024 | Size defined in bytes. |
| Aging Identifier | 0 ... 255 | A value of zero indicates no aging. |
| Cascaded Table | True False | 'True' indicates that this table is cascaded and the 'Next Table ID' field indicates the next table in the cascade. 'False' implies that the 'Next Table ID' field is not interpreted. |
| Next Table ID | 0 ... 255 | Indicates the next table in the cascade. |

TABLE 2-continued

| Parameter Name | Value | Remarks |
| --- | --- | --- |
| Max Table Size | 1 ... 16777216 | Indicates the maximum number of records in the table. |
| Max Key Size | 1 ... 255 | Max number of bits in a LPM key. |
| Threshold | 1 ... 16777216 | If number of records reaches this number, a warning is generated. |

The Table Delete API allows a table to be deleted. The table is preferably in the disabled state prior to invoking this API. When a table is deleted, all entries and the table configuration is removed. The TableID is then ready for re-use. Preferably, the only parameter for the Table Delete API is the TableID.

The Table Add Entry API allows an entry to be added to into an existing table. The table is in the Enabled or Locked state for this operation. The parameters associated with this API are depicted in Table 3.

TABLE 3

| Parameter Name | Value | Remarks |
| --- | --- | --- |
| Table ID | 0.255 | Uniquely identifies the table on which the operation is to be performed. |
| Search Key Length Search Key | 0.255 | Length is defined in bits. The key to be used for inserting the record. |
| override Entry | True False | If set to True, any existing record corresponding to the specified key will be overwritten, else the operation will not succeed (if the record pre-exists). |
| User Data Size | 1.1024 | The size of the user info (in bytes) that needs to go into the record. |
| User Data | 1.1024 | The actual user data. |

The Table Update Entry API allows an entry in a table to be updated. Three modes of operation are preferably available: Standard update, Select and Invert. All modes specify the size and position of the entry data to be modified. In the Standard Mode, the user data is overwritten starting at the specified data offset within the record. In the Select Mode a mask is specified for indicating only the bit positions which are to be modified. In Select Mode, the mask size is the same as the data size. The Invert Mode uses the mask to indicate which bit positions to invert. The table is in the Enabled or Locked state prior to invoking this API. The parameters associated with the Table Update Entry API are shown in Table 4.

TABLE 4

| Parameter Name | Value | Remarks |
| --- | --- | --- |
| Table ID | 0.255 | Uniquely identifies the table on which the operation is to be performed. |
| Search Key Length Search Key | 0.255 | Length is defined in bits. The key to be used for updating the record. |
| Update Mode | Standard Select Invert | |
| User Data Size | 1.1024 | The size of the user info (in bytes) that needs to go into the record. |

TABLE 4-continued

| Parameter Name | Value | Remarks |
| --- | --- | --- |
| User Data Offset | 1.1024 | The offset in the record where the data should be written. |
| User Data | 1.1024 | The actual user data. |
| Select Mask | 1 ... 1024 | The size equals that specified in the User Data Size field. This parameter is interpreted only if the Update Mode is 'Select' or 'Invert'. |

The Table Read Entry API is used to read an entry in a table. The table is in the enabled or locked state for the Table Read Entry API to utilize the table. The requested amount data is read from the record associated with the specified key and returned. The parameters associated with the Table Read Entry API are depicted in Table 5.

TABLE 5

| Parameter Name | Value | Remarks |
| --- | --- | --- |
| Table ID | 0 ... 255 | Uniquely identifies the table on which the operation is to be performed. |
| Search Key Length Search Key | 0 ... 255 | Length is defined in bits. The key to be used for reading the record. |
| User Data Size | 1 ... 1024 | The size of the user info (in bytes) that needs to be read. |
| User Data Offset | 1 ... 1024 | The offset in the record from where the data should be read. |

The Table Delete Entry API allows an entry to be deleted from a table. The table is in the enabled or locked state for this API. The parameters associated with the Table Delete Entry API are shown in Table 6.

TABLE 6

| Parameter Name | Value | Remarks |
| --- | --- | --- |
| Table ID | 0 ... 255 | Uniquely identifies the table on which the operation is to be performed. |
| Search Key Length Search Key | 0 ... 255 | Length is defined in bits. The key to be used for inserting the record. |

The Table Purge API is used to purge all the entries in a table. Resources that were consumed by these entries are then returned to the system for reuse. The table can be in either the enabled or disabled state prior to utilizing this API. If the table is in the enabled state, the Table Purge API preferably locks the table, purges the entries and then unlocks the table. In a preferred embodiment, the only parameter associated with the Table Purge API is the Table ID.

The Table Set Link API allows the NextTableID field to be set in the table configuration. Although the NextTableID is set when a table is defined, subsequent actions on the table chain, such as the_Table_Delete API update links from the original definition. If the Cascaded Table parameter is set to 'False', then the table identified by the Table ID parameter is the last table in the cascade. The table is preferably in the enabled state for to the Table Set Link API. In a preferred embodiment, this API automatically transitions the table to the locked state, set the new link value and then transition back to the enabled state. The parameters associated with this API are shown in Table 7.

TABLE 7

| Parameter Name | Value | Remarks |
| --- | --- | --- |
| Table ID | 0 ... 255 | Uniquely identifies the table on which the operation is to be performed. |
| Cascaded Table | True False | 'True' indicates that this table is cascaded and the 'Next Table ID' field indicates the next table in the cascade. 'False' implies that the 'Next Table ID' field is not interpreted. |
| Next Table ID | 0 ... 255 | Indicates the next table in the cascade if the 'Cascaded Table' parameter is set to 'True'. |

The Table Switch Version API is used to swap two versions of a table, preferably even if the 100 system is running. After the operation is completed, registered sequential users of the old table are transferred to the newer version of the table. The sequential access pointers and bookmarks associated with each user are reset. If Aging had been initiated on the old table and if aging is enabled on the newer version of the table, then the aging parameters are transferred to the new table and the aging operation commences. The Sequential Access ID, Aging Interval and Aging Entries parameters are all preferably inherited from the old table. The table is preferably in the enabled state prior to the Table Switch Version API operating. In a preferred embodiment, both tables are transitioned to the Locked state before performing the switch operation and automatically transitioned back to enabled state when the switch operation is concluded. The parameters associated with the Table Switch Version API are shown in Table 8.

TABLE 8

| Parameter Name | Value | Remarks |
| --- | --- | --- |
| Table ID | 0 ... 255 | Uniquely identifies the table on which the operation is to be performed. |
| New Table ID | 0 ... 255 | Indicates the table with which the original table will be swapped. |

The Table Enable API is used to transition a table from disabled to the enabled state. Transitions from other table states may result in an error. If the table is already in the enabled state, this operation is preferably treated as a essentially null operation. In a preferred embodiment, the only parameter associated with this operation is the Table ID.

The Table Disable API allows a table to be transitioned from enabled to the disabled state. If the table is already in the enabled state, this operation is essentially treated as a null operation. In a preferred embodiment, the only parameter associated with the Table Disable API is the Table ID.

The Table Lock API use used to move a table from the enabled to the locked state. After the transition to the locked state, the table is deemed to be temporarily out of service for non-administrative entities. Operations on the table from such entities are blocked until the table is unlocked or they time out. In a preferred embodiment, all generic APIs may be performed using the table control application 112 except the Table_Define API, the Table_Delete API, the Table_Enable API and the Table_Disable API. In a preferred embodiment, the only parameter associated with this operation is the Table ID.

The Table Unlock API is used to moves a table from locked to enabled state. In a preferred embodiment, the only parameter associated with this operation is the Table ID.

The Table View Config API returns the configuration information associated with a table. The configuration information is the preferably same as specified during use of the Table_Define API. In a preferred embodiment, the only parameter associated with this operation is the Table ID.

The Table List API allows the currently defined tables in the system 100 to be listed. In a preferred embodiment, in a standard mode, the output from the use of the Table List API contains a list of TableID's, the number of entries in each table, the search type, and the table state. In a preferred embodiment of a verbose mode, the output of the operation of the Table List API contains all of the parameters found in the_operations for the Table_Define API in addition to the state. Tables in the undefined state are preferably ignored by this API. A search filter enables specification of search criteria. The parameters associated with this operation are shown in Table 9.

TABLE 9

| Parameter Name | Value | Remarks |
| --- | --- | --- |
| Starting Table ID | 0 ... 255 | The id of the Table from where the list operation should commence. |
| Max Tables | 0 ... 255 | Indicates the maximum number of tables to be included in the list operation. |
| Output Mode | Standard Verbose | |
| Search Filter | All Tables Exact Match only LPM only | |

The Table Register SA API can also be utilized. A table can be set up to execute a forward sequential access or both forward and backward sequential accesses. This access can be performed by multiple users simultaneously without any detriment to one another. However, prior to performing sequential access, a user (e.g. an entity) must register to receive Sequential Access services on a particular table. The response to this service request is an SA_User Id which is used to differentiate SA users on a particular table. A table us in the enabled or locked state for this API. In a preferred embodiment, the only parameter to this operation is the Table ID. If the operation is successful, a Sequential Access ID, which is used in performing sequential access on the table, is preferably returned.

The Table Deregister SA API is used to free the Sequential Access ID and its associated resources. This API is preferably invoked after a registered entity has finished traversing a table sequentially and has no further use of the ID. A table is in the enabled or locked state prior to utilizing the Table Deregister SA API. The only parameters associated with this API are preferably the Table ID and the Sequential Access ID.

The Table Get Current Entry API is used to fetch the current record pointed to by a sequential access pointer of a particular entity. The table is in the enabled or locked state and the entity previously registered in the table for sequential access in order for the Table Get Current Entry API to function as desired. The only parameters associated with this API are preferably the Table ID and the Sequential Access ID. The Table Get Current Entry API preferably returns the User Data Size and User Data.

The Table Get Next Entry API operation is used to fetch the entity's sequential access pointer to point to the next record and then fetch the contents of the next record. The table is preferably in the enabled or locked state and the entity has previously registered for sequential access for the Table Get Next Entry API to function as desired. The sequential access pointers are also updated accordingly. In a preferred embodiment, the only parameters associated with this operation is the Table ID and the Sequential Access ID. The operation returns the User Data Size and User Data (refer to Lookup_Table_AddEntry for the specification of these fields).

The Table Get Previous Entry is used to fetch the entity's sequential access pointer to point to the previous record and then fetch the latter's contents. The sequential access pointers are also preferably updated accordingly. The table is in the enabled or locked state and the entity must have previously registered for sequential access for the Table Get Previous Entry. In a preferred embodiment, the properties of the table indicate that it is capable of both forward and backward traversal. In a preferred embodiment, the parameters associated with this operation are the Table ID and the Sequential Access ID. The operation returns the User Data Size and User Data.

The Table Process Entry API allows the entire table or a segment of the entire table to be sequentially 'walked' (either forward or backward). In addition, for every access, calls a specified procedure in order to enable the latter to process the entry. The Table Process Entry API is typically used by aging routines. The specified procedure address must have previously been bound to an ordinal number that represents that address. The enabled or locked state and the entity must have previously registered for sequential access. The parameters associated with this operation are depicted in Table 10.

TABLE 10

| Parameter Name | Value | Remarks |
| --- | --- | --- |
| Table ID | 0 . . . 255 | The id of the Table on which the operation is to be performed. |
| Sequential Access ID | 0 . . . 15 | Indicates the id of the registered user. |
| Walk Direction | Forward Backward | Indicates the direction in which the iterative traversal should be performed. |
| Procedure ID | 0 . . . 255 | Procedure to call in order to process each entry |
| Number Of Entries | 0 . . . Max Entries | Indicates the number of entries to process. Zero indicates all entries in the table. This value cannot be greater than the specified Max Entries (refer to Lookup_Table_Define) for the table. |

The Table Set Bookmark API is used with bookmarks. Bookmarks are associated with sequential table access and are used for "marking" a particular location, or record, in a table so that it is possible to directly go to the bookmark later and begin a sequential "walk" from the bookmarked record. If a bookmarked record is deleted, the bookmark is simply moved to the next record in the chain. Bookmarks are associated with registered users. Therefore each user may maintain independent bookmarks at different record locations within the same file. The Table Set Bookmark API allows a bookmark to be set at the current sequential access point within a table. The table is in the Enabled or Locked state for use of this API. Other preconditions include configured support for sequential access and user registration. The parameters associated with the Table Set Bookmark API are shown in Table 11.

TABLE 11

| Parameter Name | Value | Remarks |
| --- | --- | --- |
| Table ID | 0 . . . 255 | The id of the Table on which the operation is to be performed. |
| Sequential Access ID | 0 . . . 15 | Indicates the id of the registered user. |
| Bookmark ID | 0 . . . 3 | Upto four Bookmarks may be set per registered user per table. |

The Table Go To Bookmark API is used to initialize the sequential access pointers associated with a registered user to point to the desired bookmark of the user. If a subsequent_Table_Get Current Entry API is utilized, then the contents of the record associated with the bookmark are returned. Similarly if a subsequent Table Get Next Entry API is utilized, then the contents of the record next to the bookmarked record are returned. The table is in the enabled or locked state for this API to be successfully used. In addition, support for sequential access and user registered for sequential access are already preconfigured. The parameters associated with this operation are the same as that for the Table Set Bookmark API.

The Table Start Aging API allows aging of a table to commence. When a table is defined, it is possible to indicate whether aging is supported on the table and if so, the Aging Procedure ID is provided (refer to the Lookup Table Define API for details of the parameter). If aging is supported, the Lookup Table Define API allows the user to be automatically registered for sequential access and returns a Sequential Access ID. However, the aging procedure does not actually start until Table Start Aging API is used. Because the aging procedure involves sequential access, the Sequential Access ID returned as part of the Table Define API operations and is provided as a parameter for this operation. The table for which the Table Start Aging API is utilized is in the enabled or locked state. The parameters associated with the Table Start Aging API are depicted in Table 12.

TABLE 12

| Parameter Name | Value | Remarks |
| --- | --- | --- |
| Table ID | 0 . . . 255 | The id of the Table on which the operation is to be performed. |
| Sequential Access ID | 0 . . . 15 | Indicates the id of the registered user. |
| Aging Interval | $1 \ldots 2^{16} - 1$ | The elapsed time in seconds between aging cycles. |
| Aging Entries | 0 . . . Max Entries | Indicates the number of entries to process. Zero indicates all entries in the table. This value cannot be greater than the specified Max Entries (refer to Lookup_Table_Define) for the table. |

The Table Stop Aging API is operation is used to stop the aging function. This presupposes that aging had previously been started using the Table Start Aging API. The conditions for the table are similar to that for the Table Start Aging API. The parameters associated with this API are preferably limited to the Table ID and the Sequential Access ID used by the Table Start Aging API.

Figure 5:
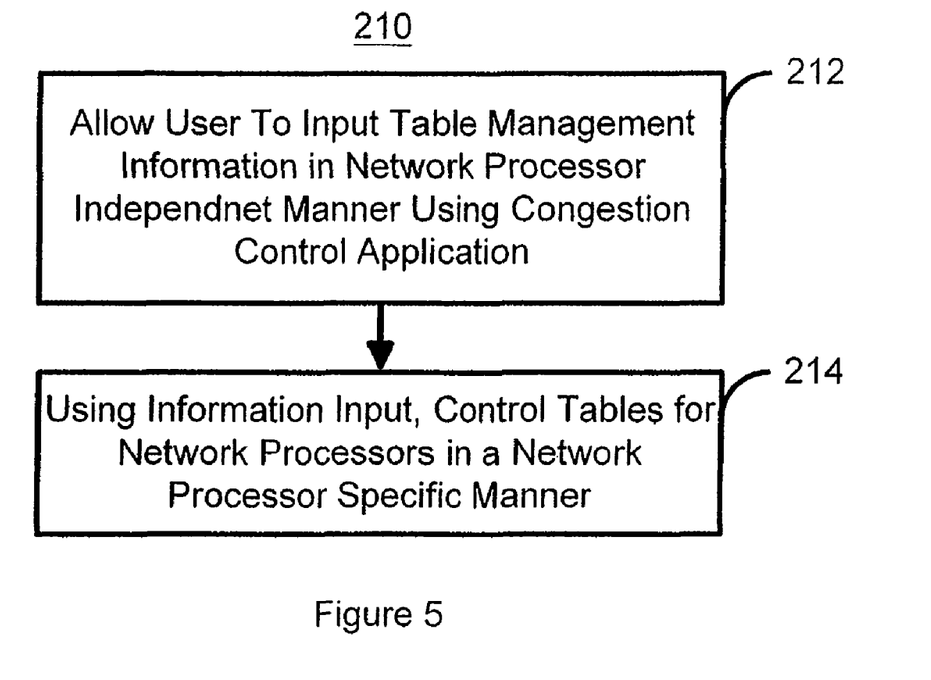
FIG. 5 is high-level flow chart of one embodiment of a method in accordance with the present invention for using a mechanism in accordance with the present invention for managing tables for network processors.

FIG. 5 is high-level flow chart of one embodiment of a method 210 in accordance with the present invention for using a mechanism in accordance with the present invention for managing tables used by network processors. For clarity, the method 210 is described in conjunction with the system 100 depicted in FIG. 2. Referring to FIGS. 2 and 5, the method 210 presumes that the network processors 120, 130, and 140, as well as the table management application 112 have been configured for use with the generic APIs 112. For example, the table management application 112 is network processor independent and has a generic interface appropriate for use with the generic APIs 112.

A user, such as a network administrator, is allowed to input information to manage the tables for the network processors 120, 130, and 140 using the generic APIs 150 in a network independent manner, via step 212. In step 212, therefore, a user might provide the identification of the network processor desired to be controlled, values of the appropriate parameters and flags, as well as other information used by the API(s) of the generic APIs being used. The generic APIs 150 are then used to control tables for the possibly heterogeneous network processors 120, 130, and 140 in a network processor specific manner, via step 214.

Using the system 100, the methods 200 and 210, and more particularly the generic APIs 150, the table management application 112 can be network processor independent. Because of the use of the generic APIs, the table management application 112 can still control tables for the potentially heterogeneous network processors 120, 130, and 140 in a network processor specific manner. As a result, the table management application 112 need not include a separate set of APIs for each type of network processor 120, 130, and 140 used. The table management application 112 is, therefore, simpler. As a result, it is significantly simpler to scale the system 100, including adding new types of network processors. It is thus also easier to improve the performance of the system 100 by adding improved network processors. In addition, the maintenance costs of the system 100 may be reduced due to the use of a simpler table management application 112.

A method and system has been disclosed for managing tables for heterogeneous network processors using a network processor independent control application. Software written according to the present invention is to be stored in some form of computer-readable medium, such as memory, CD-ROM or transmitted over a network, and executed by a processor. Consequently, a computer-readable medium is intended to include a computer readable signal which, for example, may be transmitted over a network. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for managing tables that are used by network processors to control network traffic through a network, the method comprising:

managing, by a first table management software application in a first network processor, only tables associated with the first network processor, the tables associated with the first network processor being used by the first network processor to control network traffic through the network; and managing, by a second table management software application in a second network processor, only tables associated with the second network processor, the tables associated with the second network processor being used by the second network processor to control network traffic through the network; and managing, by a table management control application in a host processor, the tables associated with the first network processor and the tables associated with the second network processor through the first table management software application and the second table management software application, the table management control application being in communication with both the first table management software application and the second table management software application through a plurality of generic application programming interfaces (APIs), the plurality of generic application programming interfaces (APIs) including, a Table Define application programming interface (API) configured to permit the table management control application of the host processor to uniquely define properties of the tables associated with the first network processor and uniquely define properties of the tables associated with the second network processor;

a Table Delete application programming interface (API) configured to permit the table management control application of the host processor to delete the tables associated with the first network processor and delete the tables associated with the second network processor;

a Table Add Entry application programming interface (API) configured to permit the table management control application of the host processor to add an entry to the tables associated with the first network processor and add an entry to the tables associated with the second network processor;

a Table Update Entry application programming interface (API) configured to permit the table management control application of the host processor to update an entry in the tables associated with the first network processor and update an entry in the tables associated with the second network processor;

a Table Read Entry application programming interface (API) configured to permit the table management control application of the host processor to read an entry in the tables associated with the first network processor and read an entry in the tables associated with the second network processor;

a Table Delete Entry application programming interface (API) configured to permit the table management control application of the host processor to delete an entry in the tables associated with the first network processor and delete an entry in the tables associated with the second network processor;

a Table Enable application programming interface (API) configured to permit the table management control application of the host processor to transition a given table associated with the first network processor from a disabled state to an enabled state and transition a given table associated with the second network processor from a disabled state to an enabled state;

a Table Disable application programming interface (API) configured to permit the table management control application of the host processor to transition a given table associated with the first network processor from an enabled state to a disabled state and transition a given table associated with the second network processor from an enabled state to a disabled state;

a Table Lock application programming interface (API) configured to permit the table management control application of the host processor to transition a given table associated with the first network processor from an unlocked state to a locked state and transition a given table associated with the second network processor from an unlocked state to a locked state; and a Table Unlock application programming interface (API) configured to permit the table management control application of the host processor to transition a given table associated with the first network processor from a locked state to an unlocked state and transition a given table associated with the second network processor from a locked state to an unlocked state.

2. The method of claim 1, wherein each of the plurality of generic application programming interfaces (APIs) are based on an abstraction in which each of the tables associated with the first network processor and each of the tables associated with the second network processor are defined to be a fast table or a standard table, the fast table having a smaller size relative to the standard table.

3. The method of claim 2, wherein each fast table is placed in a static random access memory (SRAM); and each standard table is placed in a dynamic random access memory (DRAM).

* * * * *